United States Patent [19]
Fradenburgh et al.

[11] 3,713,751
[45] Jan. 30, 1973

[54] AERODYNAMIC BLADE WITH HIGH STIFFNESS-TO-WEIGHT RATIO

[75] Inventors: Evan A. Fradenburgh, Fairfield; Edmond F. Kiely, Stratford, both of Conn.

[73] Assignee: United Aircraft Corporation, East Hartford, Conn.

[22] Filed: Oct. 29, 1970

[21] Appl. No.: 85,186

[52] U.S. Cl. ................................ 416/87, 415/226
[51] Int. Cl. ............................................ B64c 11/28
[58] Field of Search ................ 416/87, 144, 145, 226

[56] References Cited

UNITED STATES PATENTS

| | | | |
|---|---|---|---|
| 2,674,327 | 4/1954 | Pullin et al. | 416/226 |
| 2,580,363 | 12/1951 | Schnitt | 416/226 |
| 3,155,166 | 11/1964 | Stulen et al. | 416/226 |
| 3,249,160 | 5/1966 | Messerschmitt | 416/87 |
| 2,734,586 | 2/1956 | Wright et al. | 416/226 |
| 3,123,144 | 3/1964 | Stulen et al. | 416/226 |
| 3,002,567 | 10/1961 | Stulen et al. | 416/226 |
| 3,528,753 | 9/1970 | Dutton et al. | 416/226 |
| 2,552,727 | 5/1951 | Lightfoot | 416/144 |
| 2,574,651 | 11/1951 | Meyers | 416/226 |

FOREIGN PATENTS OR APPLICATIONS

| | | | |
|---|---|---|---|
| 1,059,072 | 5/1954 | France | 416/87 |

*Primary Examiner*—Everette A. Powell, Jr.
*Attorney*—Vernon F. Hauschild

[57] ABSTRACT

A flight blade or wing having a structural spar at its forward end comprising a solid forward-portion and an after-portion of low density construction, such as a sandwich construction of honeycomb, plastic foam, or balsa wood core and having a structural trailing edge pocket member to produce a blade of maximum stiffness and minimum weight by eliminating leading edge counterweights and reducing spar weight by substituting sandwich construction material for solid metal wall members in the spar after portion.

10 Claims, 7 Drawing Figures

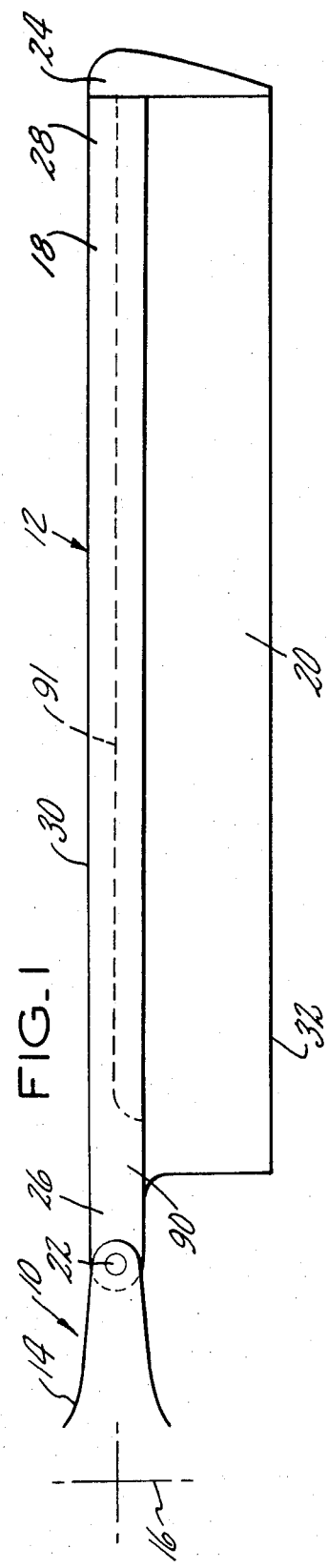
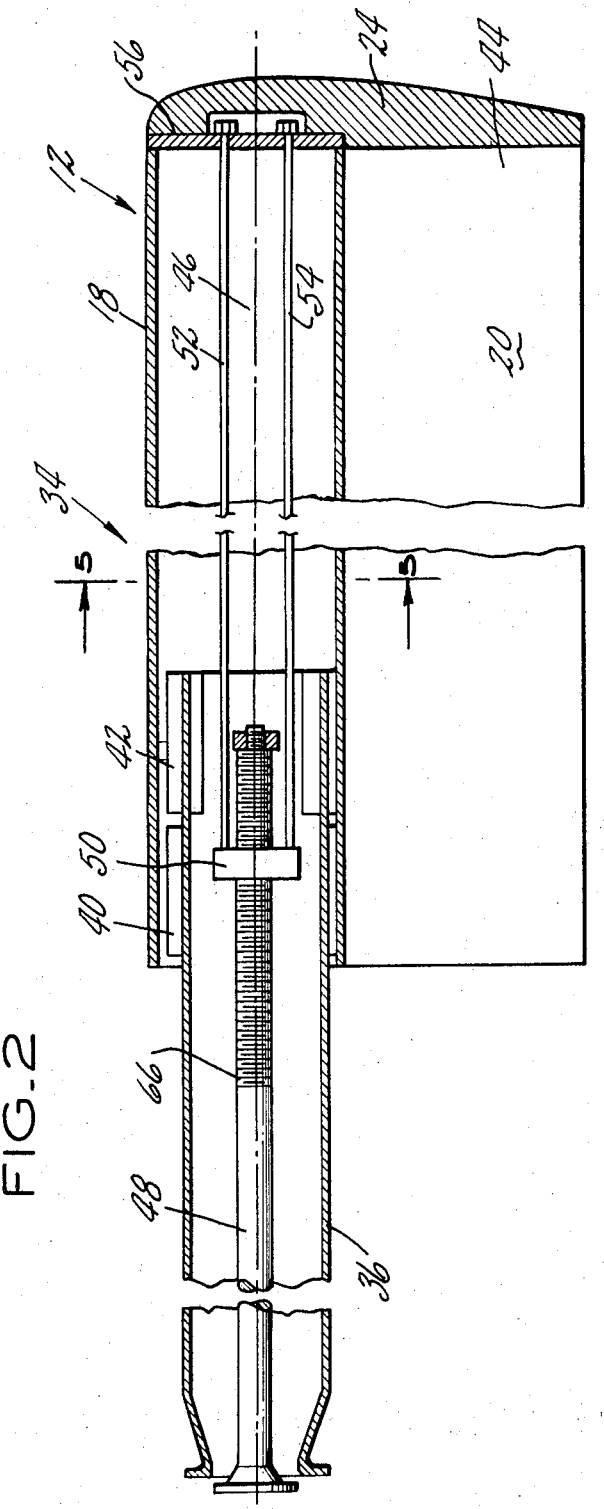
FIG.1
FIG.2
INVENTORS
EVAN A. FRADENBURGH
EDMOND F. KIELY
BY Vernon F. Hauschild
ATTORNEY

PATENTED JAN 30 1973 3,713,751

INVENTORS
EVAN A. FRADENBURGH
EDMOND F. KIELY
BY Vernon F. Hauschild
ATTORNEY

AERODYNAMIC BLADE WITH HIGH STIFFNESS-TO-WEIGHT RATIO

The invention herein described was made in the course of or under contract or subcontract thereunder with the Department of the Army.

BACKGROUND OF THE INVENTION

This invention relates to aerodynamic blades or wings and more particularly to helicopter blades which have a structural spar defining the blade leading edge and have at least one pocket member extending rearwardly thereof to cooperate therewith in defining the blade airfoil cross-section.

DESCRIPTION OF THE PRIOR ART

In the prior art, for example as shown in U.S. Pat. Nos. 2,754,917; 2,754,918; and 3,323,597, it is conventional to fabricate this type of helicopter blade so that the blade center of gravity, the flexural axis in edgewise bending, the aerodynamic center, and the blade feathering axis are located coincident with the blade quarter chord location. The structural spar is fabricated to be hollow and of substantially D-shaped cross section and terminates somewhere aft of the blade quarter chord location and forward of the blade trailing edge so as to define the blade leading edge and forward-portion. Trailing edge pocket members are attached to the spar and cooperate therewith in defining the blade airfoil cross section.

In the prior art, these trailing edge pockets are made to be nonstructural (nonload carrying) to eliminate blade trailing edge cracking problems and they must be counterbalanced by the addition of nonstructural counterweights in the blade leading edge, preferably in the spar interior, if these aforementioned axes and stations are to remain coincident. These nonstructural trailing edge pockets and counterweights add to the centrifugal force which must be carried by the blade during blade rotation but do not assist in preventing flatwise bending. As used herein, flatwise bending means blade bending about the blade axis extending between the blade leading edge and trailing edge.

Certain constructions of this type of blade have been found to have vibratory stress problems in forward flight during certain flight regimes.

SUMMARY OF THE INVENTION

A primary object of the present invention is to increase the stiffness-to-weight ratio of a helicopter blade of the structural spar-trailing edge pocket type.

In accordance with the present invention, blade weight reduction is accomplished by reducing the weight of the spar aft of the blade quarter chord station, and thereby providing the added advantage of permitting the elimination of the leading edge counterweights of the prior art blades.

A further advantage of our invention is increased cross-sectional internal area within the structural spar to thereby provide greater space for blade control equipment therein.

In accordance with a further aspect of the present invention, the blade stiffness is increased by substituting a structural pocket member for the prior art nonstructural pockets.

In accordance with a further aspect of the present invention, the structural spar after-portion is reduced in weight by fabricating the spar after-portion of a sandwich construction having inner and outer skin members and having a core material of low density, but with adequate dimensional stability and shear strength capability, such as honeycomb, plastic foam or balsa wood, in place of the prior art construction of a solid spar after-portion wall.

In accordance with still another feature of the present invention, the structural spar can remain solid walled at the areas of high load or stress concentration, for example, at the root end of the spar where the spar connects to the rotor hub and also possibly at the tip end of the spar where the centrifugal loads of the spar are carried in variable diameter rotor installations.

BRIEF DESCRIPTION OF THE DRAWINGS

FIG. 1 is a plan view of a conventional helicopter blade utilizing our invention.

FIG. 2 is a plan view in cross section illustrating a variable length blade.

DESCRIPTION OF THE PREFERRED EMBODIMENT

Figure 3:
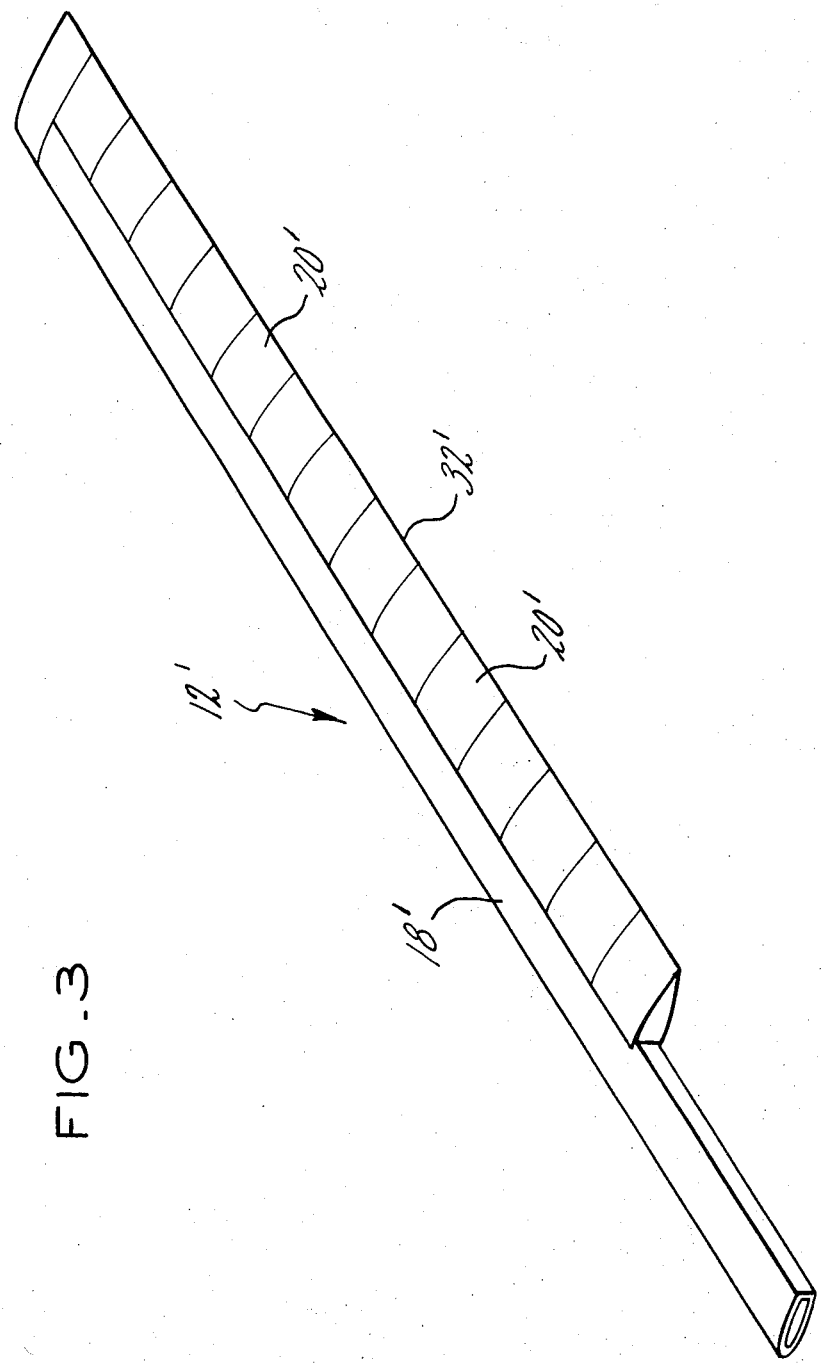
FIG. 3 is a perspective showing of a prior art blade.

Referring to FIG. 1 we see helicopter rotor 10 which consists of a plurality of rotor blades or rotary wings 12 supported by and extending from rotor hub 14 for rotation therewith about axis of rotation 16. Blade 12 consists of structural spar 18 and pocket member 20, which is connected thereto so as to form the airfoil cross section of the blade. Spar 18 is connected in conventional fashion to rotor 14 by connecting mechanism 22. Tip cap 24 is positioned at the outer end of spar 18 and pocket member 20 as a smooth aerodynamic closure therefor.

Blade 12 consists of root portion 26, which attaches to hub 14, and tip portion 28, which carries cap 24. The blade spar extends between the blade root 26 and the blade tip 28. Blade 12 further includes leading edge or forward end 30 and trailing edge or after end 32, and the blade chord extends therebetween. Rotor 10 and blade 12 may be of the type more particularly described in U.S. Pat. Nos. 3,097,701; 2,754,918; and 3,323,597.

In addition to being used on conventional blade 12 of FIG. 1, our invention can also be used with the variable length blade 34 shown in FIG. 2. A plurality of variable length blades, such as 34 of FIG. 2, are positioned for rotation about a helicopter hub and as the blades are caused to vary in length as described hereinafter, the diameter of the rotor varies. Blade 34 consists of structural spar 18 to which structural pocket member 20 attaches and cooperates to define the blade cross-sectional shape shown in FIG. 5.

Torque tube 36 is supported from a rotor hub, such as 14, for rotation therewith. Torque tube or fixed blade portion 36 supports blade spar 18 for translation therealong to cause the blade to change length. Support bearings 40 and 42 extend between torque tube 36 and blade spar 18 to allow the blade spar and hence the movable portion 44 of the blade, which consists of spar 18, pocket member 20, and tip cap 24, to translate along axis 46 with respect thereto, when blade length is varied. The actuation of blade 34 so as to vary the length thereof is caused in conventional fashion by threaded jackshaft 48 which is mounted and driven for rotation about axis 46 and which engages threaded nut 50 so that rotation of jackshaft 48 causes nut 50 to move either leftwardly or rightwardly on the jackshaft as viewed in FIG. 2, depending upon the direction of rotation of the jackshaft. Strap member 52 and 54 extend between nut 50 and plate 56, so that as nut 50 moves to the right on jackshaft 48 in the FIG. 2 environment, centrifugal force will cause blade moveable portion 44 to move to the right with respect to torque tube 36 and thereby increase the length of blade 34. When nut 50 is caused to move to the left on jackshaft 48, this movement of nut 50 causes strap members 52 and 54 to move the blade movable portion 44 leftwardly in the FIG. 2 environment, thereby reducing the length of blade 34. Variable length blade 34 may be of the type taught in and actuated as taught in U.S. Pat. Nos. 2,163,482; 3,128,829; and 3,249,160.

With the FIG. 1 and 2 blade construction in mind, it is deemed best to consider the prior art blade construction prior to going into a more complete description of our invention, so as to aid the description of our invention.

Figure 4:
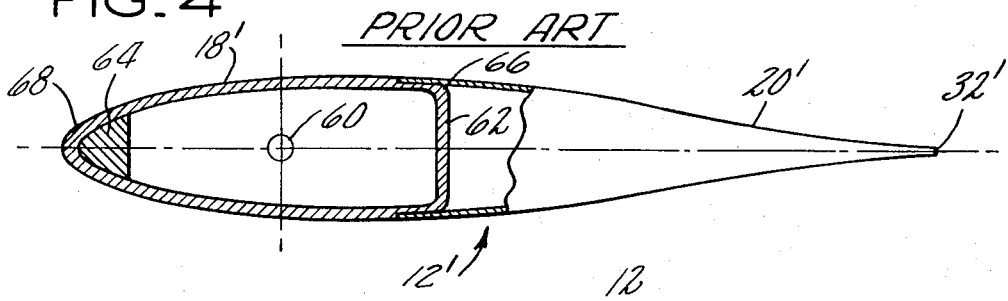
FIG. 4 is a cross-sectional showing of a prior art blade.

Viewing FIGS. 3 and 4, we see the prior art blade 12', which consists of structural spar 18' and a plurality of nonstructural pockets 20' connected thereto and extending rearwardly or aft therefrom to cooperate therewith in defining the airfoil cross section of blade 12'. Spar 18' is of D-shape cross-section and the walls thereof are made of solid, homogeneous metal, such as aluminum. The trailing edge pockets 20' consist of a plurality of nonstructural pockets adhesively bonded to spar 18' and extending rearwardly thereof to define blade trailing edge 32'. This prior art blade 12' is fabricated so that the blade center of gravity, the blade flexural axis in edgewise bending, the blade aerodynamic center, and the blade feathering axis are coincident at the blade quarter chord location 60. Spar 18' is hollow and has solid walls made of some metal, such as aluminum, and is preferably made as an extrusion and terminates at rear wall 62, the location of which is chosen to fix blade flexural axis at the desired point. The trailing edge pockets 20', of nonstructural construction, are attached thereto and extend rearwardly or aft thereof and serve to cooperate therewith in completing the airfoil cross-sectional shape of the blade 12'. The addition of the nonstructural pockets 20' to spar 18' causes the blade center of gravity to shift rearwardly or aft of quarter chord station 60 and, to bring the blade center of gravity back into coincidence with station 60, nonstructural leading edge counterweights 64 are bonded into or in other appropriate ways secured to the interior of the forward-portion of spar18'. These nonstructural members, pockets 20' and counterweights 64, add to the centrifugal force acting upon the blade during blade rotation but do nothing to stiffen the blade or strengthen the blade against either flatwise or edgewise bending, that is, bending out of the plane of rotation or in the plane of rotation.

It has been found that in certain blade constructions of this prior art type and under particular flight regimes, this blade bending produces vibratory stresses during forward flight and it is therefore the object of our invention to increase the blade stiffness-to-weight ratio so as to reduce these vibratory stresses. More precisely, our objective is to either increase the stiffness of the blade or reduce its weight, or both, so that the centrifugal force causing the aforementioned bending is reduced as a result of the weight reduction.

Our first step toward weight reduction in our invention is to remove the nonstructural counterweights 64 from the blade spar leading edge. With these nonstructural counterweights removed, the blade center of gravity has moved aft or rearwardly of station 60 and we must therefore balance the blade by removing weight aft or rearwardly of the quarter chord line 60. It is not feasible to attempt to reduce the weight of the trailing edge pockets 20' because they are already at minimum gauge to withstand aerodynamic and blade fluttering loading. We must therefore reduce the weight of the spar after-portion 66 which is aft of the quarter chord line 60. Since it is our objective to bring the blade back into balance and return the blade center of gravity to the quarter chord line 60, our objective will be to remove as much weight from the spar after-portion 66 as is necessary to counterbalance the loss of the nonstructural counterweights 64. We could conceivably do this by reducing the wall thickness of the walls of the spar after-portion 66, however, such reduced thickness walls would be unable to withstand the endwise and flatwise moments imparted to the spar walls by blade loading. It is accordingly our teaching to use a sandwich construction to form the blade after-portion 66 since such a construction is light in weight and is capable of withstanding these deforming blade forces. The particulars of this sandwich construction of the blade after-portion 66 will be described in greater particularity hereinafter.

By removing the blade counterweights 64 and substituting a sandwich construction for the solid metal wall construction of the spar after-portion 66, we have reduced the overall weight of the blade 12 and have probably slightly increased its stiffness-to-weight ratio, however, because the forward-portion 68 of the spar, which is still made of solid metal, is now stiffer than the after sandwich construction portion 66 of the spar, the spar flexural axis has shifted forward of the quarter chord line 60. To bring the flexural axis into coincidence with the quarter chord line 60, the continuous structural trailing edge member 20 will be substituted for the plurality of nonstructural pockets 20' of the prior art FIG. 3 construction. By making these changes to the prior art shown in FIG. 3, a helicopter blade of the spar-pocket type is produced which has a substantially greater stiffness-to-weight ratio and is therefore able to withstand the vibratory stresses created by the flatwise and edgewise bending moments encountered during forward flight.

Figure 5:
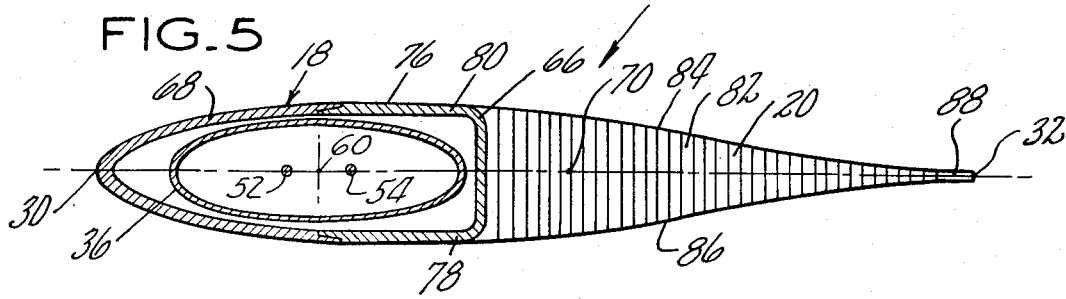
FIG. 5 is a sectional view taken along line 5—5 of FIG. 2.
Figure 6:
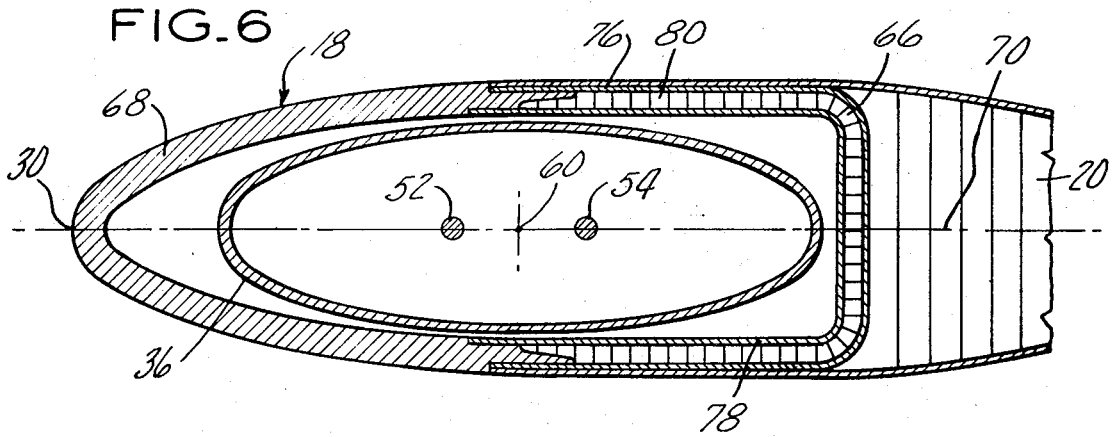
FIG. 6 is an enlarged view of a portion of FIG. 5.

Our blade construction is best described by reference to the cross-sectional showing thereof shown in FIGS. 5 and 6. The same reference numerals previously used will be used to describe the FIGS. 5 and 6 construction. Blade 12, our preferred embodiment, includes blade structural spar 18 and structural trailing edge member 20 which cooperates to define the blade airfoil cross section concentrically about chord line 70. Hollow spar 18 envelopes torque tube 36, which in turn envelopes actuating jackshaft 48 and nut 50 shown in FIG. 2. Torque tube 36, jackshaft 48, and nut 50 are preferably concentric about quarter chord line 60 with which the blade center of gravity, flexural axis in edgewise bending, aerodynamic center and feathering axis are coincident. Spar 18 consists of forward-portion 68, is preferably C-shaped in cross section and has walls of solid metal, such as aluminum, and the curved portion thereof defines the blade leading edge 30. The blade after-portion 66 is of sandwich construction and is channel-shaped and is structurally bonded to the blade forward-portion 68 and cooperates therewith to define structural spar 18 so as to be D-shaped in cross section. The sandwich construction of after spar portion 66 comprises outer skin 76, inner skin 78, and central core material 80 which extends therebetween and connects thereto in any preferred fashion, such as bonding. The core material 80 must be low density, dimensionally stable and must have adequate shear strength capabilities. We find that metal honeycomb, plastic foam, and balsa wood are suitable core materials. Preferably, outer skin 76 and inner skin 78 will be made of the same material as the spar forward-portion 68, possibly aluminum, as will the core 80 of the sandwich construction when a honeycomb core is used. It will be evident to those skilled in the art that skin materials of different moduli than the spar forward-portion 68 could be used to effect fine adjustments in the location of the flexural axis. Trailing edge pocket 20 includes a tapered honeycomb core 82 sandwiched between skin members 84 and 86, which may be made of aluminum, and which are adhesively bonded at their forward ends to spar 18 and which are adhesively bonded to and envelope blade trailing edge strip 88 at their after ends where they cooperate therewith in defining the blade trailing edge 32.

Figure 7:
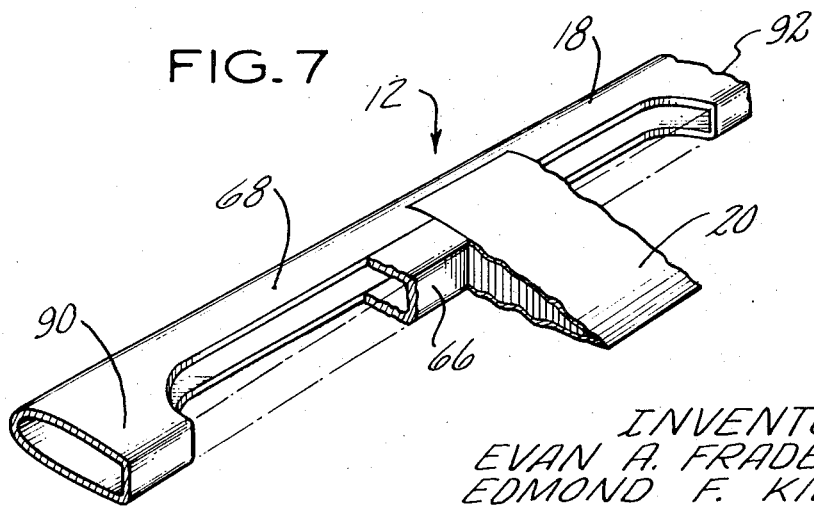
FIG. 7 is a perspective showing of a helicopter blade to better illustrate our invention.

Referring to FIG. 7 we see a perspective showing of blade 12 incorporating our invention and partially broken away to illustrate certain features of our invention. As previously described, blade 12 comprises nonhomogeneous spar 18 to which structural pocket member 20 is attached to form the blade airfoil cross section. Spar 18 consists of spar forward-portion 68, which is of solid wall construction and after-portion 66, which is of sandwich-type wall construction. As best illustrated in FIG. 7, under certain circumstances it may be desirable to maintain solid wall construction throughout the full cross section of spar 18 in regions of high load or stress. For example, FIG. 7 illustrates the spar root portion 90 and the spar tip portion 92 to be of solid wall construction throughout the full spar cross section. It is deemed desirable to have the root portion 90 of solid construction because of the heavy load which that portion of the spar must carry in transferring loads between the blade and the rotor hub. This is accordingly probably the preferred construction for all helicopter blades whether of the constant length variety shown in FIG. 1, wherein the boundary of the spar after-portion is along line 91, or the variable length variety shown in FIG. 2. In the FIG. 2 variety, it may be desirable to have the blade tip portion 92 also of the solid wall construction because of the concentrated loads which are passed therethrough between extension members 52 and 54 and the actuating nut 50.

From the above description it will be obvious that we have produced a helicopter blade of high stiffness-to-weight ratio by fabricating the hollow structural spar to be of nonhomogeneous, continuous, single wall construction with the after-portion of sandwich construction so as to be less dense than the solid forward-portion and thereby permitting the elimination of leading edge counterweights, and preferably also utilizing a structural trailing edge member with the spar in preference with the conventional nonstructural trailing edge pockets.

We wish it to be understood that we do not desire to be limited to the exact details of construction shown and described, for obvious modifications will occur to a person skilled in the art.

We claim:

1. A helicopter blade having a blade leading edge and a blade trailing edge and a blade chord extending therebetween and further including a blade root section and blade tip section located at opposite ends of the blade span and including:
   A. a hollow structural spar of D-shaped cross section extending along the blade span and having:
      1. a forward-portion fabricated of solid metal and being of C-shaped cross section and positioned so that the curved portion of the C defines the blade leading edge and so that the legs of the C extend aft;
      2. an after-portion comprising a wall of sandwich construction and being of channel-shaped cross section and of lower density than the spar forward-portion and connected thereto to cooperate therewith in defining a hollow spar of D-shaped cross section and which wall comprises:
         a. an outer skin,
         b. an inner skin,
         c. and a low density core extending between and connected to said skins;
   B. a structural pocket member positioned aft of said spar and connected thereto and shaped to define the blade trailing edge and to cooperate with said spar to define the blade cross-sectional shape.

2. Apparatus according to claim 1 wherein said core is of honeycomb construction.

3. Apparatus according to claim 1 wherein said core is plastic foam.

4. Apparatus according to claim 1 wherein said core is fabricated from balsa wood.

5. A helicopter blade having a blade leading edge and a blade trailing edge and a blade chord extending therebetween and further including a blade root section and blade tip section located at opposite ends of the blade span and including:
   A. a hollow structural spar of D-shaped cross section extending along the blade span and having:
      1. a forward-portion fabricated of solid metal and being of C-shaped cross section and positioned so that the curved portion of the C defines the blade leading edge and so that the legs of the C extend aft, 2. an after-portion comprising a wall of sandwich construction and being of channel-shaped cross section and of lower density than the spar forward-portion and connected thereto to cooperate therewith in defining a hollow spar of D-shaped cross section and which wall comprises:
   a. an outer skin,
   b. an inner skin,
   c. and a low density core extending between and connected to said skins;

B. a structural pocket member positioned aft of said spar and connected thereto and shaped to define the blade trailing edge and to cooperate with said spar to define the blade cross-sectional shape and being of sandwich construction including:
1. an outer skin,
2. an inner skin,
3. a tapered honeycomb core extending between and connected to said skins.

6. Apparatus according to claim 5 and wherein said pocket member includes a trailing edge strip member extending spanwise along said blade and positioned between said pocket inner and outer skins and cooperating therewith to define said blade trailing edge.

7. A helicopter blade having a blade leading edge and a blade trailing edge and a blade chord extending therebetween and further including a blade root section and blade tip section located at opposite ends of the blade spar and including:
A. a hollow structural spar of D-shaped cross section extending along the blade span and having:
1. A forward-portion fabricated of solid metal and being of C-shaped cross section and positioned so that the curved portion of the C defines the blade leading edge and so that the legs of C extend aft,
2. an after-portion of channnel-shaped cross section fabricated to be of lower density than the spar forward portion and connected thereto to cooperate therewith in defining a hollow spar of D-shaped cross section,
B. a pocket member positioned aft of said spar and connected thereto and shaped to define the blade trailing edge and to cooperate with said spar to define the blade cross-sectional shape, and
wherein said blade spar includes:
A. a root portion of D-shaped cross section with solid metal walls and defining the spar forward-portion and the spar after-portion at the spar root, and
B. a tip portion of D-shaped cross section with solid metal walls and defining the spar forward-portion and the spar after portion at the spar tip.

8. A helicopter blade having a blade leading edge and a blade trailing edge and a blade chord extending therebetween and further including a blade root section and blade tip section located at opposite ends of the blade spar and including:
A. a hollow structural spar of D-shaped cross section extending along the blade span and having:
1. a forward-portion fabricated of solid metal and being of C-shaped cross section and positioned so that the curved portion of the C defines the blade leading edge and so that the legs of C extend aft,
2. an after-portion of channel-shaped cross section fabricated to be of lower density than the spar forward-portion and connected thereto to cooperate therewith in defining a hollow spar of D-shaped cross section,
B. a pocket member positioned aft of said spar and connected thereto and shaped to define the blade trailing edge and to cooperate with said spar to define the blade cross-sectional shape, and
wherein said blade spar includes:
A. a root portion of D-shaped cross section with solid metal walls and defining the spar forward-portion and the spar after-portion at the spar root.

9. A rotary blade hollow structural spar shaped to define the forward portion of the airfoil shape of the blade and including:
A. a solid walled forward-portion extending along the blade span and defining the blade leading edge,
B. a sandwich construction, walled after-portion attached to and shaped to cooperate with said forward-portion to form the blade structural spar and including:
1. an outer skin,
2. an inner skin,
3. lightweight core material extending between and connected to said inner and outer skin, and
C. wherein said spar forward-portion is of selected wall thickness and of C-shaped cross section and positioned so that the curved portion of the C defines the blade leading edge and so that the legs of C extend aft therefrom and, further, wherein the spar after-portion is of substantially the same wall thickness as said wall thickness of said forward-portion and is of channel-shaped cross section with the legs of the channel connected directly to the legs of the spar forward-portion to form a smooth continuation thereof so that the spar forward and after-portions cooperate to define a hollow spar of D-shaped cross section and substantially constant wall thickness.

10. A variable length aerodynamic blade including:
A. a fixed blade portion adapted to connect to a driving hub for rotation therewith,
B. a movable blade portion mounted on said fixed blade portion for movement with respect thereto so as to vary the blade length and including:
1. a hollow structural spar of D-shaped cross section extending along the blade span and having:
a. a forward-portion fabricated of solid metal and being of C-shaped cross section and positioned so that the curved portion of the C defines the blade leading edge and so that the legs of the C extend aft,
b. an after-portion comprising a wall of sandwich construction and being of channel-shaped cross section and of lower density than the spar forward-portion and connected thereto to cooperate therewith in defining a hollow spar of D-shaped cross section and which wall comprises:
1. an outer skin,
2. an inner skin, 3. and a low density core extending between and connected to said skins, 2. a structural pocket member positioned aft of said spar and connected thereto and shaped to define the blade trailing edge and to cooperate with said spar to define the blade cross-sectional shape, and C. means to cause said movable blade portion to move relative to said fixed blade portion so as to vary blade length.

* * * * *